US009927921B2

(12) United States Patent
Lee

(10) Patent No.: US 9,927,921 B2
(45) Date of Patent: Mar. 27, 2018

(54) INFRARED TOUCH SCREEN DEVICE

(71) Applicant: Jun Goo Lee, Seoul (KR)

(72) Inventor: Jun Goo Lee, Seoul (KR)

( * ) Notice: Subject to any disclaimer, the term of this patent is extended or adjusted under 35 U.S.C. 154(b) by 10 days.

(21) Appl. No.: 15/186,972

(22) Filed: Jun. 20, 2016

(65) Prior Publication Data

US 2017/0308236 A1 Oct. 26, 2017

(30) Foreign Application Priority Data

Apr. 25, 2016 (KR) ........................ 10-2016-0050217

(51) Int. Cl.
*G06F 3/041* (2006.01)
*G06F 3/042* (2006.01)

(52) U.S. Cl.
CPC .......... *G06F 3/0418* (2013.01); *G06F 3/0412* (2013.01); *G06F 3/0421* (2013.01); *G06F 2203/04103* (2013.01); *G06F 2203/04104* (2013.01)

(58) Field of Classification Search
CPC .... G06F 3/0418; G06F 3/0412; G06F 3/0421; G06F 3/042; G06F 2203/04103; G06F 2203/04104
See application file for complete search history.

(56) References Cited

U.S. PATENT DOCUMENTS 4,672,558 A * 6/1987 Beckes ................. G06F 3/0421 341/31
4,751,379 A * 6/1988 Sasaki ................... G06F 3/0421 250/221
4,812,830 A * 3/1989 Doering ................ G06F 3/0421 250/221
2012/0176343 A1* 7/2012 Holmgren ............... G06F 3/042 345/175
2013/0285977 A1* 10/2013 Baharav ................ G06F 3/0414 345/174
2014/0062863 A1* 3/2014 Yu ......................... G06F 3/0418 345/156
2014/0098058 A1* 4/2014 Baharav ................ G06F 3/0421 345/174
2014/0267170 A1* 9/2014 Mckiel, Jr. ........... G09B 21/001 345/175
2015/0034811 A1* 2/2015 David .................... G02B 6/264 250/227.11
2015/0331544 A1* 11/2015 Bergstrom ........... G06F 3/0428 345/175

* cited by examiner

*Primary Examiner* — Tom Sheng
(74) *Attorney, Agent, or Firm* — Novick, Kim & Lee, PLLC; Sang Ho Lee

(57) ABSTRACT

Provided is an infrared touch screen device including the transmission unit which contains the rectangular bezel which is constituted so that the touch screen panel is to be installed, and the multiple numbers of light transmitting elements which are installed in the lengthwise direction of corresponding bezel to one horizontal bezel and one vertical bezel respectively among the bezels and transmitting the infrared rays forward, and the reception unit which is further configured to have the multiple numbers of light receiving elements which are installed at two bezels among the bezels so that the infrared rays transmitted from the transmission unit is to be received and contain the band pass filter which makes only the infrared rays of specific wavelength band among the infrared rays transmitted from the transmission unit to be received by the multiple numbers of light receiving elements.

6 Claims, 11 Drawing Sheets

INFRARED TOUCH SCREEN DEVICE

CROSS-REFERENCE TO RELATED APPLICATIONS

This application claims the benefit of priority under 35 USC § 119(a) from Korean Patent Application No. 10-2016-0050217 filed on Apr. 25, 2016, the entire content of which is hereby incorporated by reference.

FIELD OF TECHNOLOGY

This invention is for the infrared touch screen device.

THE TECHNOLOGY THAT BECOMES THE BACKGROUND OF INVENTION

Touch screen is the device of inputting the signal in accordance with the calculation of the coordinates when a particular section on the screen is directly/indirectly touched with hand or tool, etc.

For the large size touch screen among conventional touch screen technologies, the infrared method which recognizes the coordinates within the touch screen by using the infrared sensor is mainly used, and the representative system of this infrared method is the opto-matrix system which is the method of recognizing the touched section by arranging several units of light emitting elements and light receiving elements and conducting simultaneous or sequential transmission and reception so that a grid structure is constituted at the upper section of screen and touching the screen with finger or the item which can intercept the light and calculating the coordinates of the point where the reception of light is intercepted.

This kind of infrared touch screen is applied to the touch screen which is relatively large, and has the advantages that it can possess excellent performance based on high reliability and can be embodied with relatively low cost, therefore, the prospect of market activation is highly probable in the future and it is expected to be the representative model of the touch screen of next generation.

When considering the infrared touch screen from the viewpoint of recent market demand, the size of display panel is becoming larger, however, the size of bezel is in the trend of becoming thinner and smaller on the contrary, therefore, all the related structures constituting the touch screen are in the trend of slimming down. For the touch panel with the structure of thin bezel, the demands for installing not only at indoor environment where the influence of sunlight is not existed, but also at outdoors or at the inside of building where large amount of sunlight is coming in (similar outdoors) are in the trend of increasing gradually, and the utilization of large size touch screen is also being increased.

However, large size touch screen has the problems of generating the malfunction of touch or dropping of the operation velocity since the noise is increased at the SNR of infrared transmission light signal because the maximum detection value of infrared reception element is abnormally raised as large amount of direct and indirect influence is received by the interference wavelength radiated from sunlight (to be referred to as "external light" hereafter), and hence, the detection value (signal) of infrared reception unit by the touch of user becomes conspicuously lowered compared to the maximum detection value which was abnormally raised by the external light.

The basic cause for these problems is that the effect of the infrared filter used for the infrared touch screen with thin bezel structure is not sufficient enough for its intercepting function (removing rate) of external light, and this is because of the fact that if the size of touch screen is increased, the interference of external light becomes larger.

DETAILS OF INVENTION

The Tasks to be Solved

The task to be solved by this invention is to provide the infrared touch screen device which improves the touch recognition rate and minimizes the malfunction rate by drastically removing the interference of external light with the band pass filter which passes only the signal of specific wavelength band.

In addition, the task to be solved by this invention is to provide the infrared touch screen device with improved structure for the band pass filter whose performance is greatly improved comparing to the conventional high pass filter used for removing the influence of external light, outside stray light, reflected light, and so forth at the infrared touch screen constituted with the arrangement of numerous infrared light emitting elements and light receiving elements and for installing the filter.

And, the task to be solved by this invention is to provide the infrared touch screen device which can be used at outdoor environment by sufficiently removing the influence of external light, outside stray light, reflected light, etc.

Also, the task to be solved by this invention is to provide the filter structure with thin and long shape by reflecting the recent trend of thinning the thickness of the bezel of touch screen for complying with the trend of product market, and at the same time, to provide the infrared touch screen device with high quality and low price through the reduction of manufacturing cost.

The embodiment in accordance with this invention can be used for accomplishing another task which is not specifically mentioned besides above tasks.

Solving Method of Tasks

The infrared touch screen device which is in accordance with one of the embodiments of this invention for solving above tasks is rectangular bezel in which the touch screen panel is to be installed.

One horizontal bezel and one vertical bezel among the above bezels are installed in the direction of length at each of the corresponding bezels, and the transmission unit including multiple numbers of light transmitting elements which transmit infrared forward, and the reception unit including multiple numbers of light receiving elements installed at two bezels of the above bezels to receive the infrared transmitted from the above transmission unit and the band pass filter which makes only the infrared of specific wavelength band among the infrared transmitted from the above transmission unit to be received to the above multiple numbers of light receiving elements are contained.

For the above transmission unit, the band pass filter which transmits only the infrared of specific band of the infrared transmitted from the above multiple numbers of light transmitting elements can additionally be included.

The entire band pass filters of the above transmission unit and reception unit have uniform filter characteristic through vacuum metalizing, and they are manufactured with the length as much as that of the installed bezel.

Each of the above multiple numbers of light transmitting elements transmit the infrared signal of 900~1,000 nm band, and the above band pass filter conducts the filtering of the infrared signal of 900~1,000 nm band, and the above multiple numbers of light receiving elements receive the infrared signal of 850~1,100 nm band respectively.

The above reception unit and transmission unit additionally contain the high pass filter installed at the front of the above band pass filter, and the above band pass filter is fixed by being inserted into the installation groove with "⊏" shape which is built in the direction of the length of corresponding bezel, and the above band pass filter and high pass filter are installed to be vertical to the light axis of infrared.

The above reception unit and transmission unit additionally contain the high pass filter installed at the front of the above band pass filter, and the above band pass filter is fixed by being inserted into the installation groove with "⊏" shape which is built in the direction of the length of corresponding bezel, and the above band pass filter and high pass filter are installed to be 5°~10° inclined in relation to the axis perpendicular to the light axis of infrared.

Effect of Invention

In accordance with the one embodiment of this invention, the amount of interference of external light can be reduced more than 5 times when compared to existing filter by inserting the band pass filter which passes only the band of wavelength sent from the light transmitting element with improved external light removing performance instead of existing infrared filter (high pass filter) into the infrared touch screen with the structure of thin frame size (bezel size), and a stable outdoor and similar outdoor installation and operation of touch screen can be conducted through the improvement effect of removing the interference of external light.

In addition, in accordance with the one embodiment of this invention, the improvement of touch velocity/touch accuracy and the embodiment of advanced and multi touch function can easily be conducted through the reduction of the interference of external light, and the saving of peripheral circuit material (material cost) and development cost can be conducted by enabling the reduction of the control algorithm of touch operation due to the removal or reduction of the external light signal interference amount measuring algorithm.

Also, in accordance with the one embodiment of this invention, manufacturing cost can be reduced with the improvement of productivity and reduction of inferior items through the improvement of manufacturing efficiency by applying the structural mechanism which makes the insertion into the bezel easy and maximizes the interception effect of external light to manufacturing item.

SPECIFIC CONTENTS FOR CONDUCTING THE INVENTION

Figure 1:
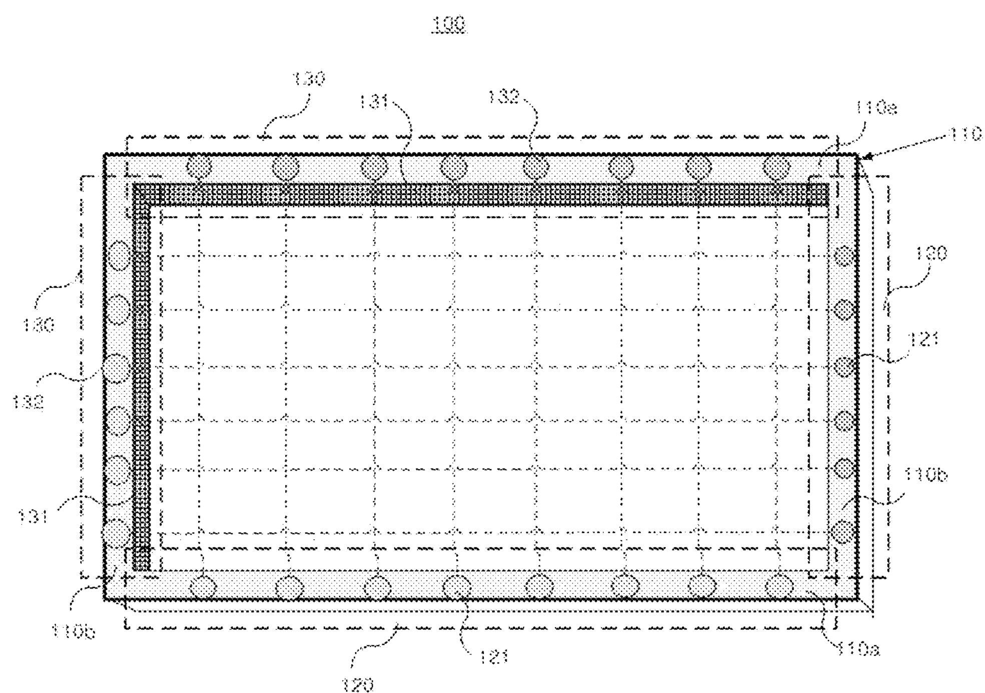
FIG. 1 is the oblique view which shows the constitution of infrared touch screen device which is in accordance with the embodiment of this invention.

In the following, detailed description is conducted for the embodiment of this invention by referring to the attached drawing figures so that the person with ordinary knowledge in the field of the technology belonged to this invention can easily be implemented. This invention can be embodied with various different shapes and is not limited to the embodiment described here. In order to describe this invention accurately from the drawings, the section which is not related with the description is omitted, and for the overall specification, identical reference numeral is used for the identical or similar constitution element. In addition, for the common knowledge technology which is widely disseminated, detailed explanation is omitted.

In this specification, when a certain constitution element is "included" in a certain section, this means that another constitution element is not to be excluded but can additionally be included unless any specific opposite description is existed. In addition, the terms such as ". . . unit", "module", and so forth mean the unit which processes at least one function or operation, and this can be embodied with the combination of hardware or software, or hardware and software.

In the following, the infrared touch screen which is in accordance with the embodiment of this invention is described by referring to the attached FIG. 1 to FIG. 11.

FIG. 1 is the oblique view which shows the constitution of infrared touch screen device which is in accordance with the embodiment of this invention. By referring to the FIG. 1, the infrared touch screen device 100 which is in accordance with the embodiment of this invention includes the bezel 110, two transmission units 120, and two reception units 130.

The bezel 100 is constituted with the shape of rectangle which is combined with two horizontal (X axis) bezels **110*a*** and two vertical (Y axis) bezels 110*b*, and the touch panel (not illustrated) is installed at the internal space of the rectangle created by the bezel 100.

The transmission unit 120 is installed at one horizontal bezel 110*a* and one vertical bezel 110*b* among the bezels 110, and the reception unit 130 is installed at another horizontal bezel 110*a* and another vertical bezel 110*b*. At this moment, the transmission unit 120 and the reception unit 130 are installed so that they are faced with each other, therefore, the infrared signal transmitted from the transmission unit 120 is received at the reception unit 130.

The transmission unit 120 constitutes the infrared beam with grid shape as the multiple numbers of light transmitting elements 121 are arranged along the lengthwise direction of the frame 110*a*, 110*b* with the established space at the inside of the corresponding frame 110*a*, 110*b*. In addition, each of the multiple numbers of light transmitting elements 121 transmits the infrared signal of around 900~1,000 nm band through the exposed section of frame. At this moment, the light transmitting element 121 can be the LED (Light-Emitting Diode) element or LD (Laser Diode) element, etc.

Figure 10:
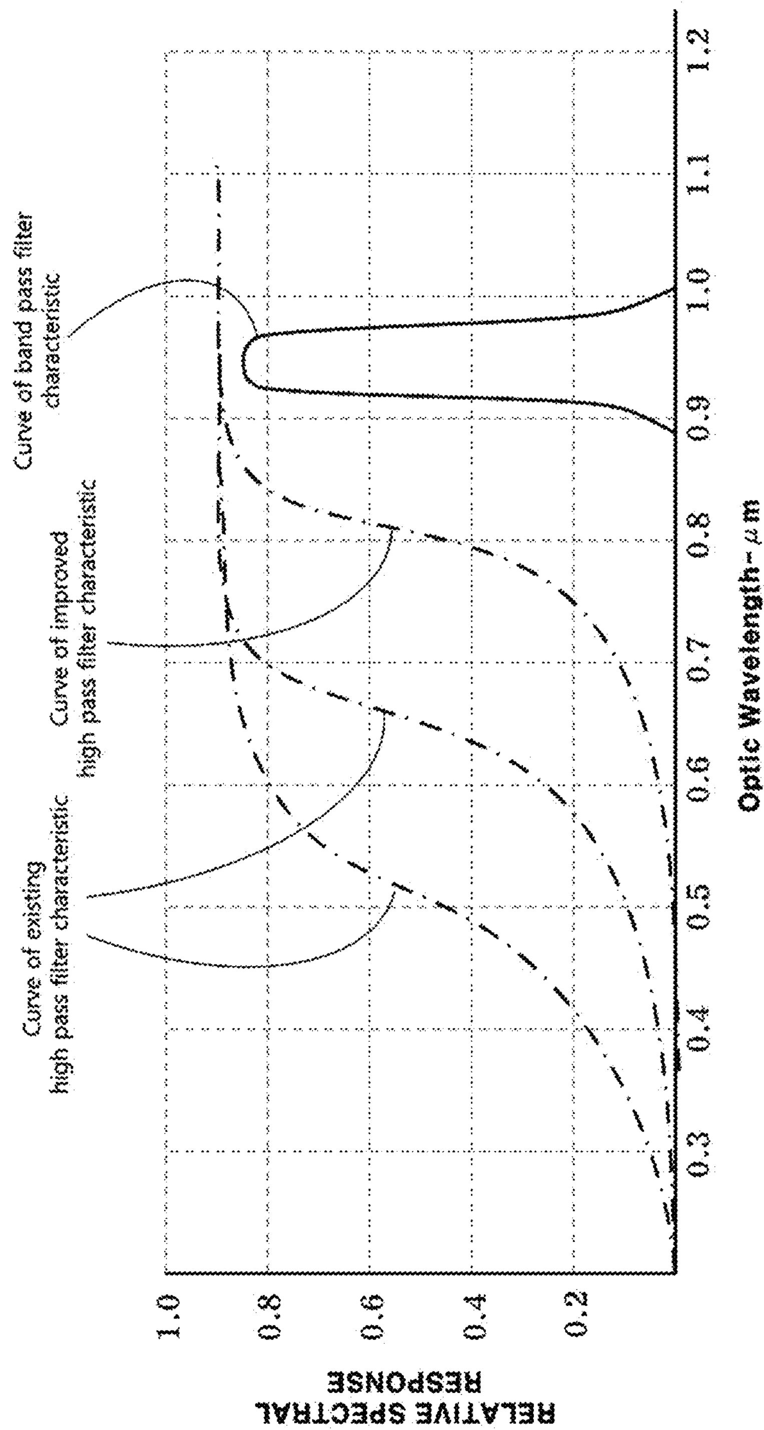
FIG. 10 is the graph which compares the characteristic of band pass filter which is in accordance with the one embodiment of this invention with high pass filter.

As shown in the FIG. 10, the reception unit 130 includes the band pass filter 131 which conducts the filtering the infrared signal of around 900~1,000 nm band (the range of light wavelength), and the multiple numbers of light receiving elements 132 which receives the infrared signal of around 850~1,100 nm band. Especially, the multiple numbers of light receiving elements 132 are desirable to be the infrared light receiving element with the light peak value and band width of 940 nm±10 nm.

The multiple numbers of light receiving elements 132 are arranged along the lengthwise direction of the frame 110*a*, 110*b* with the established space at the inside of the corresponding frame 110*a*, 110*b*, and receiving the infrared signal of a specific band (Example: around 900~1,000 nm) which is collected and filtered by the band pass filter 132 through the exposed section of frame. If examining, at this moment, the characteristic of light wavelength of the infrared receiver 132 illustrated in the (a) of the FIG. 11, it can be understood that the spectrum distribution of sunlight (i.e., the influence of sunlight) is not sufficient at the light wavelength range of around 900~1,000 nm. In accordance with this, by making the infrared signal to be transmitted to the light receiving element 132 through the filtering of the section where the interference by the sunlight is minimized, the band pass filter 131 raises the recognition rate furthermore and prevents the malfunction.

Meanwhile, in accordance with the embodiment of this invention, the filtering band of the band pass filter 131 is established in responding to the wavelength of light signal transmitted from the light transmitting element 121, and the light receiving band of light receiving element 132 is to be decided. This means that if the wavelength band of the light signal transmitted from the light transmitting element 121 is not the wavelength of around 900~1,000 nm but the wavelength of another range, the range of the filtering of the band pass filter 131 and the range of the light reception of the light receiving element 132 will be different in accordance with it.

In addition, in order to minimize furthermore the influence for external light, the transmission unit 120 can include the band pass filter 122 (refer to the FIG. 2) which filters only the infrared signal of a specific band (Example: around 900~1,000 nm) among the infrared signals transmitted from the light transmitting element 121.

In the following, description is conducted with the example of installing the band pass filter 122 even at the side of the transmission unit 120.

Figure 2:
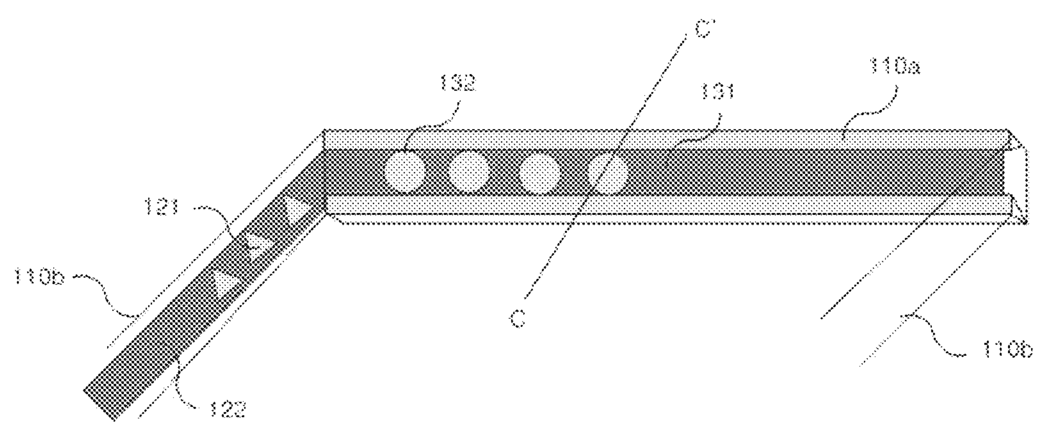
FIG. 2 is the view which shows the installation state of band pass filter in the infrared touch screen device which is in accordance with the embodiment of this invention.

FIG. 2 is the view which shows the installation state of band pass filter in the infrared touch screen device which is in accordance with the embodiment of this invention, and it is for the case of installing the band pass filter 122 even to the transmission unit 120.

In general, before starting the explanation, the conventional infrared touch screen device which uses the high pass filter passes the external light at more than 700 nm when examining the removing amount of external light by the high pass filter and the external light is removed at less than 600 nm, therefore, the interference amount of external light which can be removed is in the insufficient level. In addition, in the band of more than 700 nm, the infrared receiver has the wide band reception area, therefore, the conventional infrared touch screen has the problem that the interference of external light cannot be avoided due to the low removing rate of the external light.

As one of the methods to solve this conventional problem, the band pass filter 122, 131 which passes only the band of specific wavelength is used for the infrared touch screen device which is in accordance with the embodiment of this invention as shown in the FIG. 2. At this moment, the band pass filter 122, 131 is manufactured with thin and long shape so that another interference signal other than the light emitting (light transmitting) signal transmitted from the light transmitting element 121 will not be received, and located within the corresponding bezel 110*a*, 110*b* so as to be very near to the light receiving element 132 or light transmitting element 121. For instance, the band pass filter 122, 131 is manufactured to be a thin and long rod shape so that it is matched with the length of the corresponding bezel 110*a*, 110*b* and installed at the corresponding bezel 110*a*, 110*b*, or manufactured to be two or three rods with thin and long shape and installed at the corresponding bezel 110*a*, 110*b*. Of course, it is desirable that the number of the band pass filter 122, 131 which is to be installed at one of the bezels is one piece, however, multiple pieces can be installed in accordance with the manufacturing cost and other circumstances, and whenever the length of the bezel 110*a*, 110*b* is extended, the number of band pass filter 122, 131 can be increased.

In the mean time, if the band pass filter 122, 131 is manufactured with the mixture of chemical combination structure in which the pigment that can absorb the light energy for each of the wavelengths is mixed with the polycarbonate material, which is generally used for manufacturing conventional light filter, the uniformity will be deteriorated because the composition of mixture is not uniformly distributed to all of the filter, and hence, its role of filtering cannot be fulfilled at high light wavelength band. This phenomenon will be conspicuous when the length of the band pass filter 122, 131 becomes thin and long.

Accordingly, the band pass filter 122, 131 which is in accordance with the embodiment of this invention is manufactured with vacuum metalizing method, and in order to secure the manufacturing process and reliability of product which are identical with those of the conventional infrared touch screen for the object of metalizing treatment, it is manufactured by metalizing and coating the band pass filter which can pass only a specific band to the material with wide area of the plastics (polycarbonate material and so forth) which are identical with existing filter. The band pass filter 122, 131 which is produced in this way is manufactured with the overall length, for instance, of around 0.3 m~2 m so that it can be applied to various sizes of touch screens, and the filter characteristic of selectively passing the specific band is uniformly embodied to the entire section of touch screen.

The wavelength which is to be passed at this moment can be changed in accordance with the requirement of touch screen device including 940 nm band which is mainly used recently.

Figure 3:
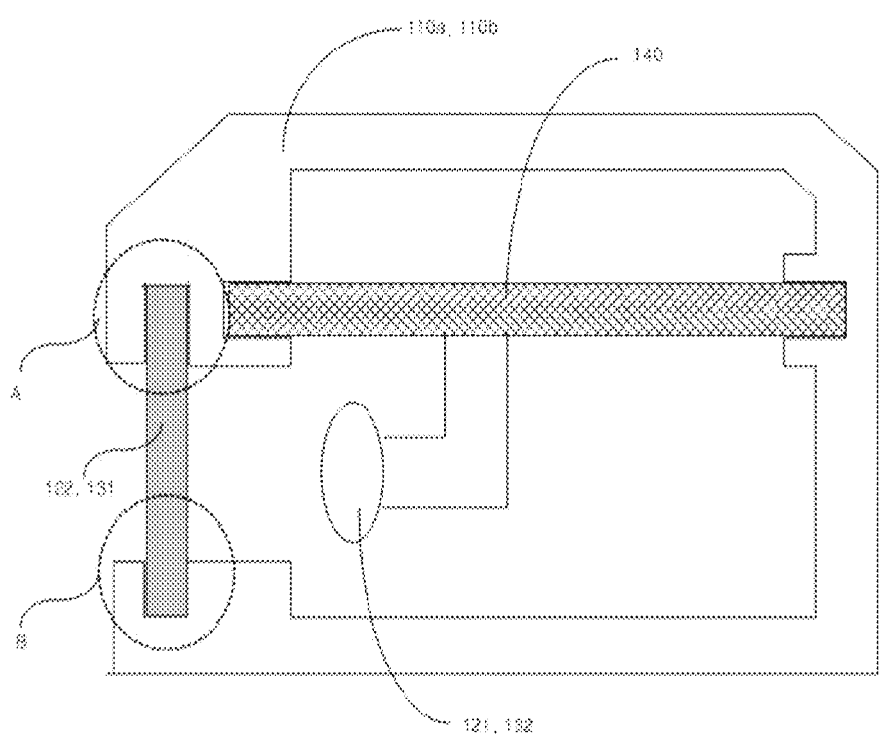
FIG. 3 is the sectional view which shows the installation state of each constitution in the infrared touch screen device which is in accordance with the first embodiment of this invention.

FIG. 3 is the sectional view which shows the installation state of each constitution in the infrared touch screen device which is in accordance with the first embodiment of this invention, and it is the sectional view of the case of cutting the horizontal bezel 110*a* illustrated in the FIG. 2 at c-c' section in the vertical direction. Needless to say, the installation state of each constitution illustrated in the FIG. 3 is identical with that of the vertical bezel 110*b*.

When referring to the FIG. 3, in the case of the infrared touch screen device 100 which is in accordance with the first embodiment of this invention, one band pass filter 122, 131 is installed to one bezel 110*a*, 110*b*. At this moment, an installation groove with "⊏" shape is formed to each bezel 110*a*, 110*b* in the lengthwise direction, and a penetration groove is formed at the front of the section where light transmitting element 121 or light receiving element 132 is created, or overall penetration groove is formed along with the axis on which light transmitting element 121 or light receiving element 132 is arranged.

Consequently, the band pass filter 122, 131 is installed vertically to the light axis of infrared rays by inserting and fixing into the installation groove with "⊏" shape. The light transmitting element 121 or light receiving element 132 is installed in the internal space which is formed by the bezel 110*a*, 110*b* so that they transmit the infrared rays which are filtered via the band pass filter 122 through the penetration groove, or receive the infrared rays which are filtered by the band pass filter 131.

Meanwhile, the PCB board 140 is installed for fixing at the internal space formed by the bezel 110*a*, 110*b*, and the light transmitting element 121 or light receiving element 132 is electrically connected to the PCB board 140.

Figure 4:
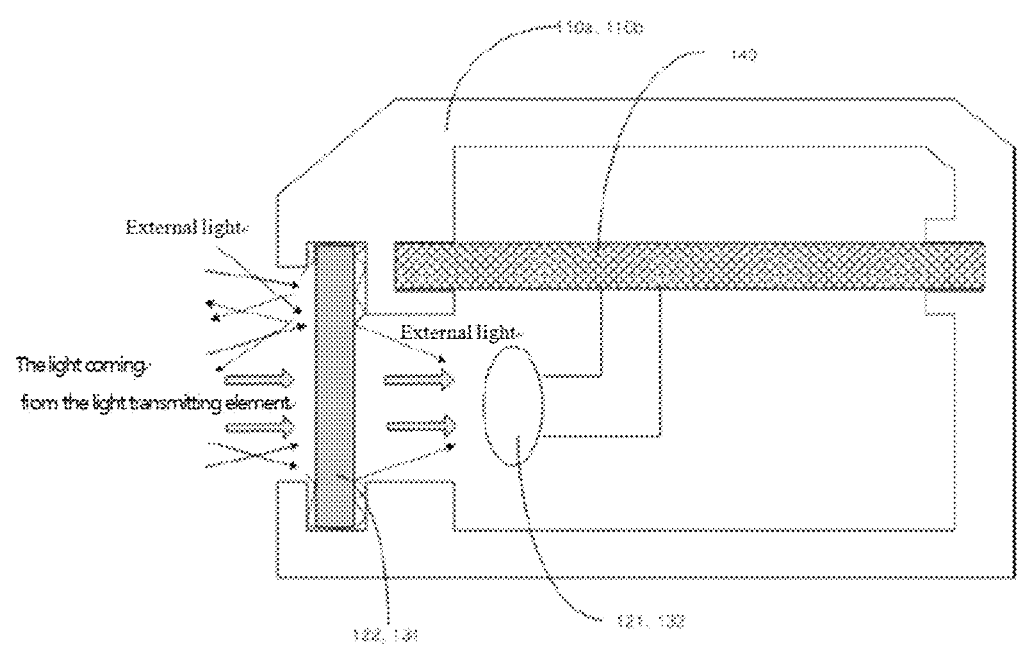
FIG. 4 is the view which shows the path of light incidence at the reception unit side of the infrared touch screen device illustrated in FIG. 3.

Describing the light which is transmitted to the reception unit side from the infrared touch screen device which is in accordance with the first embodiment of this invention constituted as above with the reference of the FIG. 4, the infrared rays transmitted from the light transmitting element 121 is arrived together with the external light such as sunlight or illumination light, etc. Of course, most of the external light is filtered and removed by the band pass filter before they are arrived at the light receiving element 132.

However, if the strength of external light (including sunlight) becomes larger, the possibility that influence can be exerted by the external light which is passed through the minute clearance of the installation groove with "⊏" shape in which the band pass filter 122, 131 is mounted will be increased. In order to remove the influence from the external light passing through the minute clearance of this installation groove, the second to the fifth embodiment of this invention are provided as follows.

Figure 5:
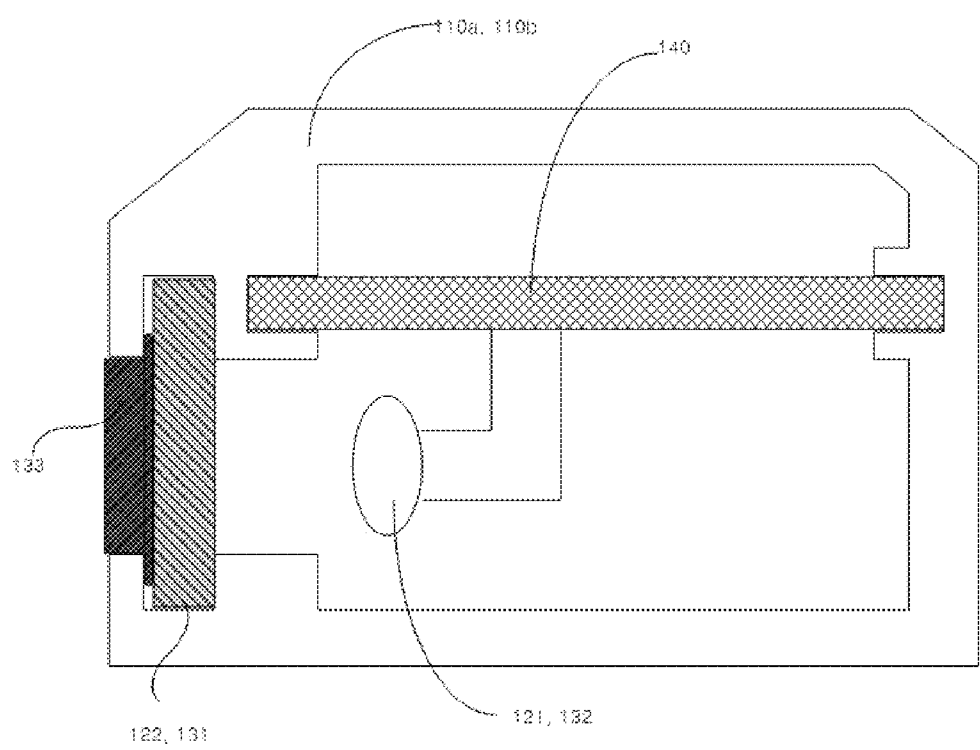
FIG. 5 is the sectional view which shows the installation state of each constitution in the infrared touch screen device which is in accordance with the second embodiment of this invention.

FIG. 5 is the sectional view which shows the installation state of each constitution in the infrared touch screen device which is in accordance with the second embodiment of this invention. If referring to the FIG. 5, the infrared touch screen device 100 which is in accordance with the second embodiment of this invention is the case of adding the high pass filter 133 to the first embodiment of this invention for which the FIG. 4 is referred to. At this moment, the high pass filter 133 is installed at the front of the band pass filter 122, 131 so as to be located at the outside of bezel and adhered to the band pass filter 122, 131. Therefore, the infrared rays which are transmitted to the light receiving element 132 is primarily filtered by the high pass filter 133 and secondarily filtered by the band pass filter 131. In this case, the best high pass filter 133 is the one having the characteristics of removing the light wavelength of less than at least 900 nm and passing the light wavelength of more than 900 nm, however, having the conventional characteristics of passing the light wavelength of more than 700 nm and removing the light wavelength of less than 600 nm is also allowable.

Figure 6:
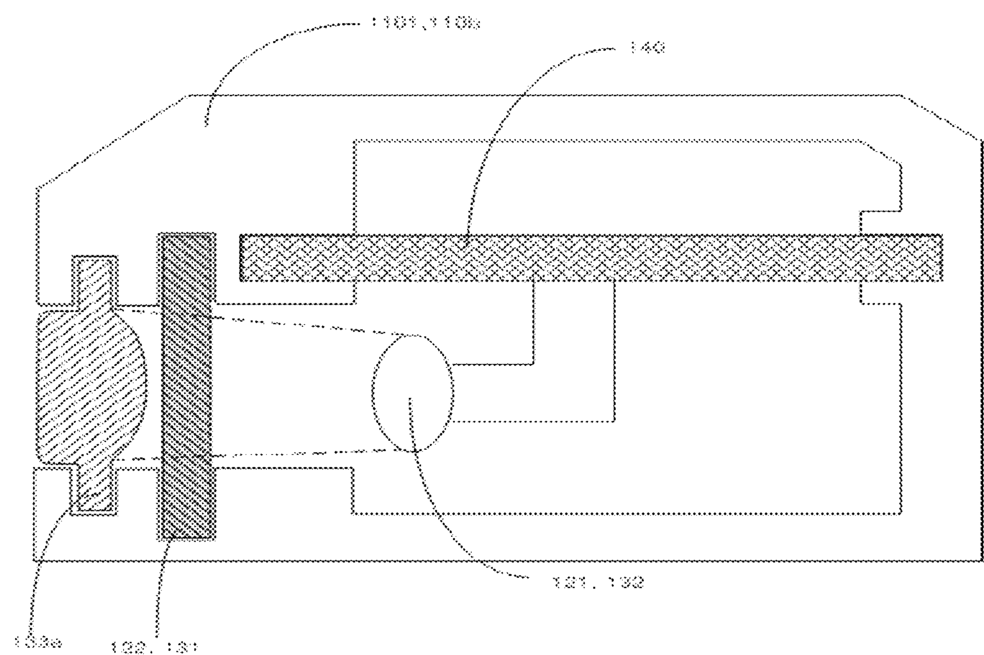
FIG. 6 is the sectional view which shows the installation state of each constitution in the infrared touch screen device which is in accordance with the third embodiment of this invention.

FIG. 6 is the sectional view which shows the installation state of each constitution in the infrared touch screen device which is in accordance with the third embodiment of this invention. If referring to the FIG. 6, the infrared touch screen device 100 which is in accordance with the third embodiment of this invention is the case of adding the high pass filter 133*a* to the first embodiment of this invention for which the FIG. 4 is referred to, and at this moment, unlike the high pass filter 133 of the second embodiment, the surface of the high pass filter 133*a* has convex shape with a fixed curvature at least at the location near to the band pass filter 122, 131. Of course, both sides of the high pass filter 133*a* can have the convex shape.

This high pass filter 133*a* is installed at the front of the band pass filter 122, 131 so as to be located at the outside of bezel, as in the case of the second embodiment, and to be separated or adhered to the band pass filter 122, 131. Therefore, the infrared rays transmitted to the light receiving element 132 is primarily filtered by the high pass filter 133*a* and secondarily filtered by the band pass filter 122, 131. In this case, the best high pass filter 133*a* is the one having the characteristics of removing the light wavelength of less than at least 900 nm and passing the light wavelength of more than 900 nm, however, having the conventional characteristics of passing the light wavelength of more than 700 nm and removing the light wavelength of less than 600 nm is also allowable.

Using the high pass filter 133*a* with convex shape in this way demonstrates drastic performance for removing the external light by the band pass filter 122, 131, however, its transmittance is relatively low compared to the general high pass filter. Especially, in the case of the touch screen device with large size, the distance between the transmission unit and reception unit is wide (for instance, in the case of 60 inch, its distance is extended to 1.5 m), therefore, if the transmitting power of the transmission unit is low, problem can be generated for the transmittance. In order to complement this disadvantage, by locating the high pass filter 133*a* with convex shape at the front of the band pass filter 122, 131, the effect of improving the transmittance can be expected as the high pass filter 133*a* can perform the role of lens. In this case, the thickness or curvature of the convex surface of the high pass filter 133*a* can be adjusted in accordance with the characteristic of device, i.e., the location of light receiving element or the size of frame.

Figure 7:
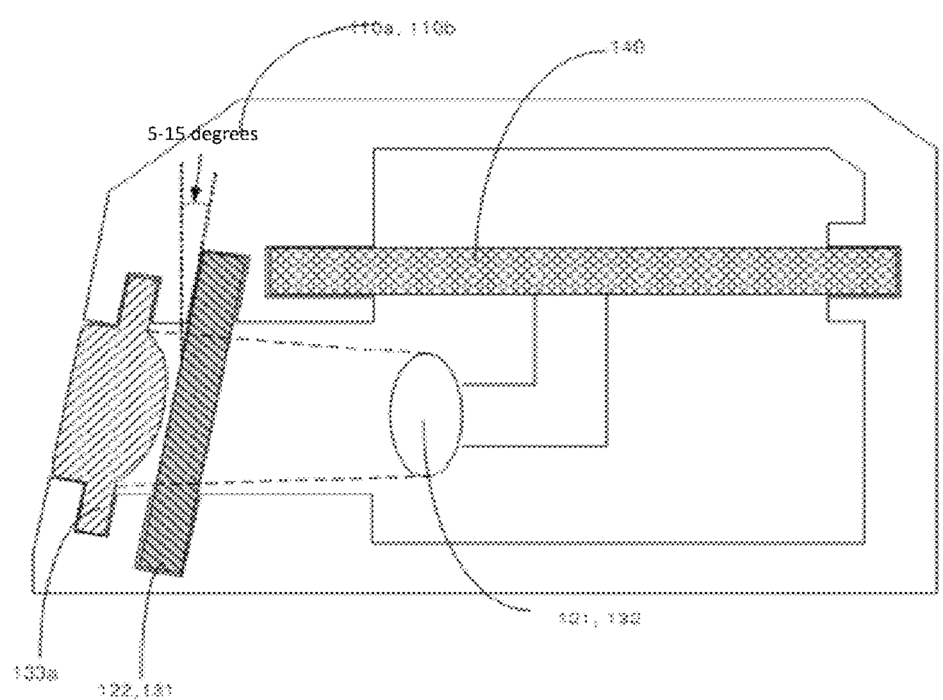
FIG. 7 is the sectional view which shows the installation state of each constitution in the infrared touch screen device which is in accordance with the fourth embodiment of this invention.

FIG. 7 is the sectional view which shows the installation state of each constitution in the infrared touch screen device which is in accordance with the fourth embodiment of this invention. If referring to the FIG. 7, for the infrared touch screen device 100 which is in accordance with the fourth embodiment of this invention, the high pass filter 133*a* having at least one convex surface is installed at the front of the band pass filter 122, 131 as in the case of the third embodiment, however, the high pass filter 133*a* and the band pass filter 122, 131 are installed with the inclination of the established angle in relation to the light axis of infrared rays. For instance, the high pass filter 133*a* and the band pass filter 122, 131 are installed with the inclination of 5°~10° in relation to the vertical axis (the axis vertical to the light axis of infrared rays).

Installing the high pass filter 133*a* and the band pass filter 122, 131 with the inclination of 5°~10° in relation to the vertical axis is to strengthen the interference removal against the external light which is additionally generated due to extreme reflection and diffraction of sunlight. In addition, installing the high pass filter 133*a* and the band pass filter 122, 131 with the inclination of 5°~10° in relation to the vertical axis is to prepare for the case of erroneous touch recognition due to the reflection of light transmitted immediately from another adjacent axis when the light is intercepted with finger and the like at the square area (corner section) where X axis and Y axis of the touch screen device are crossed. In other words, if the light is intercepted at the corner adjacent to the left section of the horizontal bezel 110*a* and the upper section of vertical bezel 110*b*, the light coming from the light transmitting element 121 of vertical bezel 110*b* is reflected and the reflected light can be received from the light receiving element 102 of horizontal bezel 110*a*, and hence, there is the possibility of conducting the erroneous touch recognition. Therefore, this kind of error can be prevented by providing some slope to the inputting section of filter so that the reflected light will not directly be inputted.

Meanwhile, as another embodiment of this invention, for the second embodiment of this invention with the reference of the FIG. 5, as in the case of the fourth embodiment, the high pass filter 133 and the band pass filter 122, 131 can be installed with the inclination of 5°~10° in relation to the vertical axis so that the effect which is identical with the fourth embodiment will be obtained.

Figure 8:
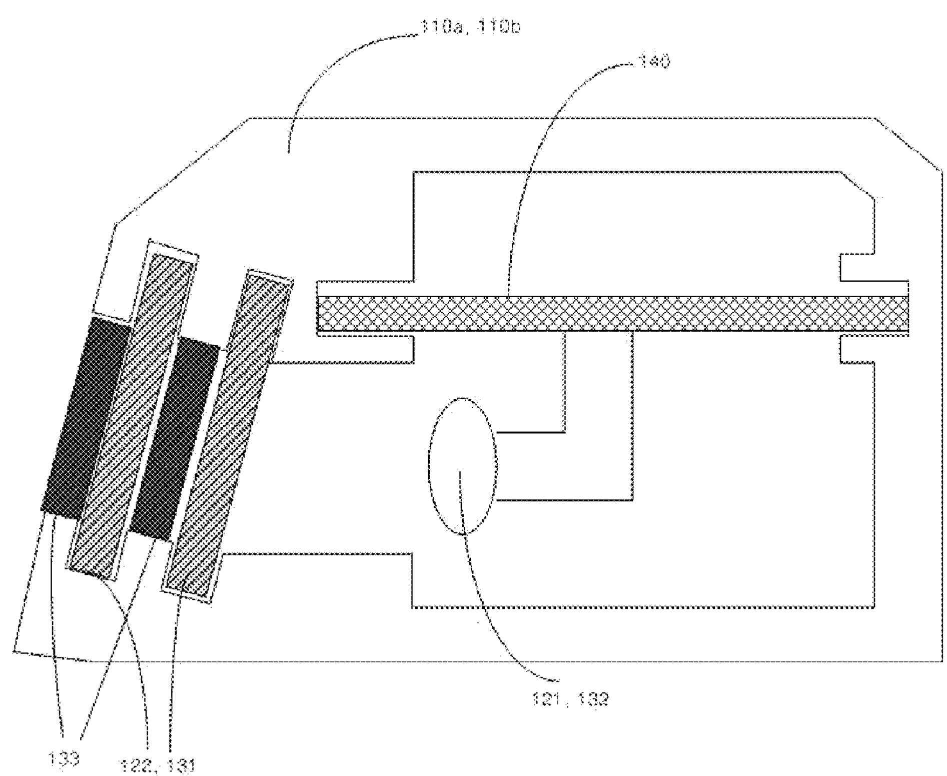
FIG. 8 is the sectional view which shows the installation state of each constitution in the infrared touch screen device which is in accordance with the fifth embodiment of this invention.

FIG. 8 is the sectional view which shows the installation state of each constitution in the infrared touch screen device which is in accordance with the fifth embodiment of this invention. If referring to the FIG. 7, the infrared touch screen device 100 which is in accordance with the fourth embodiment of this invention uses two band pass filter 122, 131 and two high pass filter 133 or 133*a*. At this moment, from the outside of the bezel 110*a*, 110*b*, one high pass filter 133 or 133*a* is located, and then, one band pass filter 122, 131 is located, and then, another high pass filter 133 or 133*a* is located, and finally, one band pass filter 122, 131 is located.

Figure 9:
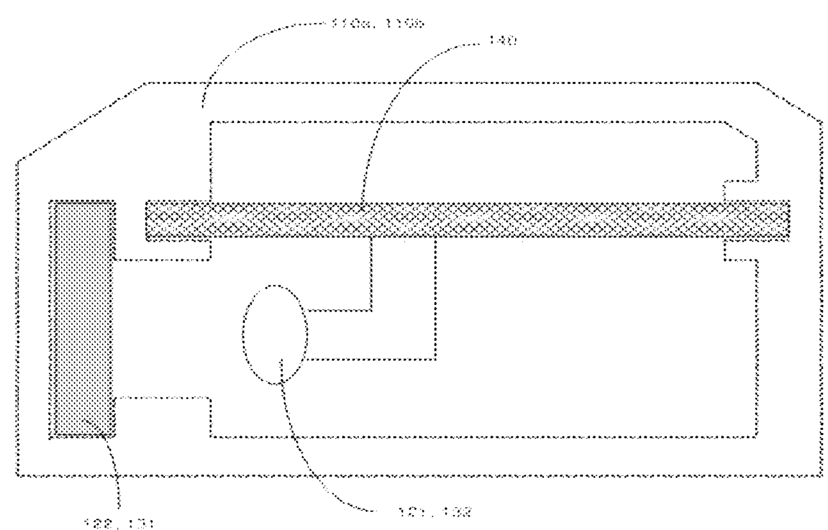
FIG. 9 is the view which describes the bezel for waterproofing/vibration proofing in the infrared touch screen device which is in accordance with the embodiment of this invention.

FIG. 9 is the view which describes the bezel for waterproofing/vibration proofing in the infrared touch screen device which is in accordance with the embodiment of this invention. As the demand of using large size touch screen device at outdoors is gradually increased, not only the influence of sunlight but also the touch screen device with waterproofing/vibration proofing structure is required. Accordingly, in the case of the infrared touch screen device 100 which is in accordance with the embodiment of this invention, the bezel 110*a*, 110*b* constitutes the bezel for waterproofing/vibration proofing which protects the band pass filter 120, internal light transmitting element 101, light receiving element 102 and the electronic circuit board 103 as illustrated in the FIG. 9. At this moment, the bezel 110*a*, 110*b* for waterproofing/vibration proofing can be used with the type of mixing the material of high light transmittance and rigidity as in the case of PMMA (acryl) with the pigment for filter, because it takes the role of high pass filter so that all the functions of filter and waterproofing/vibration proofing can be conducted.

Figure 11:
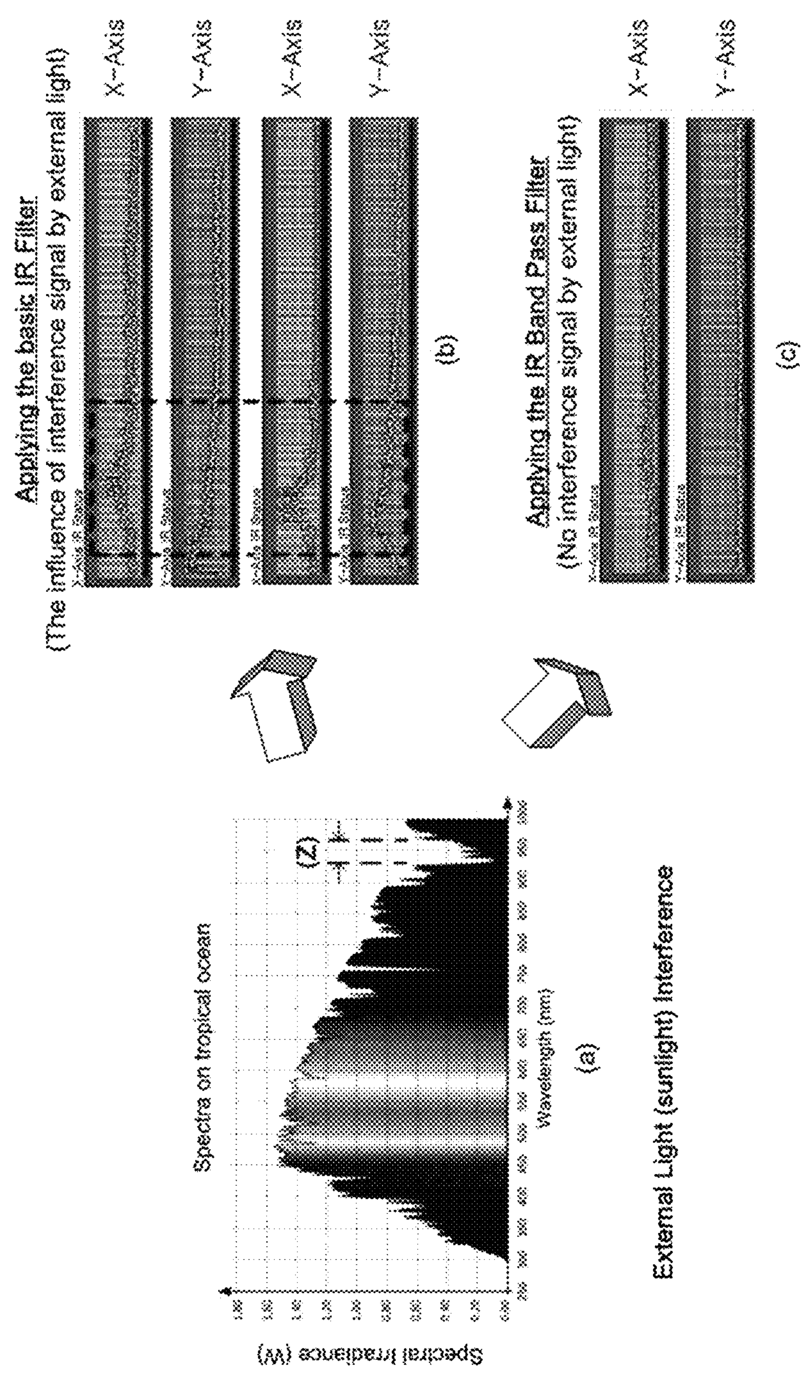
FIG. 11 is the view which shows the interference characteristic of the infrared touch screen device which is in accordance with the embodiment of this invention.

FIG. 11 is the view which shows the interference characteristic of the infrared touch screen device which is in accordance with the embodiment of this invention. If referring to the FIG. 11, in the case of the infrared touch screen which is in accordance with the embodiment of this invention as mentioned above, it can be confirmed that the interference due to external light is remarkably reduced compared to the conventional case (b of the FIG. 11) by the characteristic of the band pass filter as illustrated in (c) of the FIG. 11.

Detailed description is presented as above for the embodiment of this invention, however, the scope of the right of this invention is not limited to this, and the diverse variants and improved shapes which are accomplished by the person with common knowledge in the field where this invention is contained are belonged to the scope of the right of this invention.

The invention claimed is:

1. A rectangular bezel constituted so that an infrared touch screen panel is to be installed, the infrared touch screen device comprising:

a transmission unit in which the corresponded frame is installed in the lengthwise direction to one horizontal bezel and one vertical bezel among the bezels and comprises a multiple numbers of light transmitting elements from which infrared rays are transmitted forward;

a reception unit configured to:

comprise a multiple numbers of light receiving elements installed at two bezels among the bezels in order to receive the infrared rays transmitted from the transmission unit a band pass filter which makes only the infrared rays of specific wavelength band among the infrared rays transmitted from the transmission unit to be received by the multiple numbers of light receiving elements, wherein the transmission unit is further configured to contain additionally a band pass filter which transmits only the infrared rays of specific band among the infrared rays transmitted from the multiple numbers of light transmitting elements, wherein the band pass filters of the transmission unit and reception unit is further configured to have uniform filter characteristic for the entire filter through the vacuum metalizing, and to be manufactured with the length as long as that of the installed bezel.

2. The infrared touch screen device of claim 1, wherein each of the multiple numbers of light transmitting elements is further configured to transmit the infrared signal of 900~1,000 nm band, and the band pass filter is further configured to filter the infrared signal of 900~1,000 nm band, and each of the multiple numbers of light receiving elements is further configured to receive the infrared signal of 850~1,100 nm band.

3. The infrared touch screen device of claim 1, wherein the reception unit and transmission unit are further configured to contain additionally the high pass filter installed at the front of band pass filter, and the band pass filter is further configured to be inserted and fixed into the installation groove with "⊏" shape which is formed in the lengthwise direction to the corresponding bezel, and the band pass filter and high pass filter are further configured to be installed vertically against the light axis of the infrared rays.

4. The infrared touch screen device of claim 3, wherein the reception unit and transmission unit are further configured to contain additionally the high pass filter installed at the front of band pass filter, and the band pass filter is further configured to be inserted and fixed into the installation groove with "⊏" shape which is formed in the lengthwise direction to the corresponding bezel, and the band pass filter and high pass filter are further configured to be installed with the inclination of 5°~10° in relation to the axis which is perpendicular to the light axis of infrared rays.

5. The infrared touch screen device of claim 4, wherein the high pass filter is further configured to make at least its surface adjacent to the band pass filter having convex shape.

6. The infrared touch screen device of claim 3, wherein the high pass filter is further configured to make at least its surface adjacent to the band pass filter having convex shape.

* * * * *